K. GOLDSCHMIDT & J. WEBER.
PROCESS OF DETINNING TIN SCRAP.
APPLICATION FILED MAY 6, 1910.
1,005,022.
Patented Oct. 3, 1911.
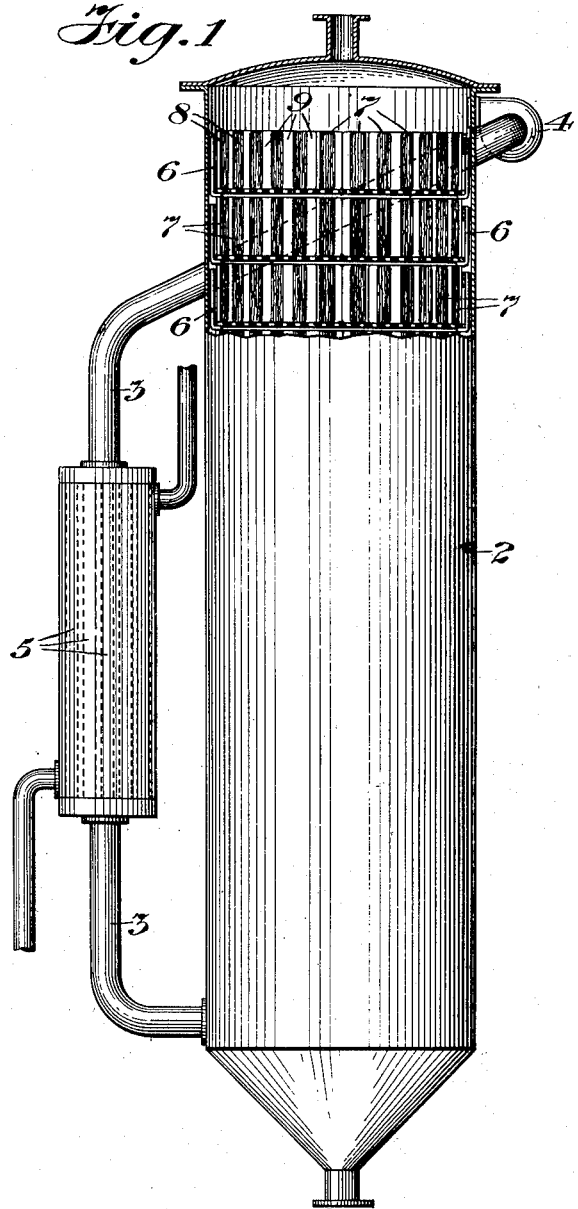
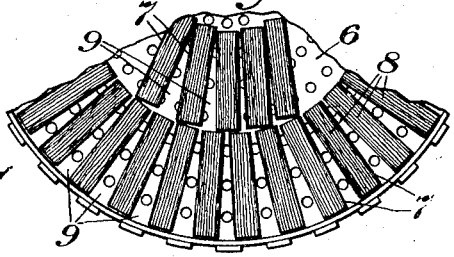
WITNESSES:
Chas F. Clagett
G. W. Stucker
INVENTORS
Karl Goldschmidt
Josef Weber
BY
Chas. F. Dane
ATTORNEY

UNITED STATES PATENT OFFICE.

KARL GOLDSCHMIDT AND JOSEF WEBER, OF ESSEN-ON-THE-RUHR, GERMANY.

PROCESS OF DETINNING TIN-SCRAP.

1,005,022. Specification of Letters Patent. Patented Oct. 3, 1911.

Application filed May 6, 1910. Serial No. 559,772.

*To all whom it may concern:*

Be it known that we, KARL GOLDSCHMIDT and JOSEF WEBER, both subjects of the King of Prussia, German Emperor, and residents of Essen-on-the-Ruhr, in the Province of the Rhine, German Empire, have jointly invented certain new and useful Improvements in the Process of Detinning Tin-Scrap, of which the following is an exact specification.

Our invention relates to a process of detinning tin scrap, as for example, by the use of chlorin, either alone or in conjunction with inert gases or an anhydrous fluid, as set forth in Patent No. 831,223, granted to us September 18th, 1906, and in other patents heretofore granted to us. As set forth in said patent, it is important in the commercial detinning of tin scrap to make use of scrap in a much condensed or compressed form, and it is customary, as set forth in said patent, for us to make use of closely compressed bundles of tin scrap in detinning with chlorin gas, etc., as the chlorin can pass through the finest openings and thus get at the coating of tin even on those pieces of scrap farthest from the surfaces of the bundles. The condensation of the tin scrap into closely compressed bundles introduces, however, additional problems in the art of detinning tin scrap, as it is obviously more difficult to dissipate rapidly the heat generated in compact bundles of tin scrap than it is to dissipate the heat generated in a loose mass containing a very much smaller quantity of scrap. It is also more difficult for the stannic chlorid produced in the reaction to drain off from the surfaces of the scrap unless special provision is made for facilitating such drainage.

In a prior application filed by us August 1st, 1906, Ser. No. 328,793, we have disclosed one method of controlling the heat in the reaction vessel for the purpose of preventing undue heating or burning of the scrap at any point or points in the compact bundles being treated, and for the further purpose of equalizing as nearly as possible the temperature in such vessel and keeping such equalized temperature within proper limits.

The main objects of our present invention are to control more effectively the heat generated in the vessel in which the reaction takes place and to bring about a thorough and rapid separation or drainage of the stannic chlorid resulting from the reaction as fast as that product is formed. In carrying our improvements into effect we make use, as heretofore, of tin scrap which has been properly condensed into a relatively small space by compression into bundles. In the making of these bundles the loose scrap is thrown into a mold and compressed by a plunger. The result of this operation is that the pieces of scrap are crushed down and assume positions substantially parallel with one another and perpendicular to the line of compression. Such bundles present special difficulties to detinning by means of chlorin, because the temperature in the detinning vessel must be as nearly uniform as possible throughout said vessel, and the temperature employed must be below the boiling point of the stannic chlorid resulting from the reaction. The temperature in the detinning chamber can be kept down and equalized by properly circulating the detinning reagent, as set forth in our aforesaid prior application, but if the bundles employed are of large size, and especially if they are substantially cubical in form, it is more difficult to carry away at a sufficiently rapid rate the heat generated by the reaction in the interiors of such bundles. It is still more difficult to do this if the bundles are placed in the reaction vessel in such a manner that their laminæ are disposed at a right angle to the line of flow of the circulating detinning reagent.

We have found that the temperature in the reaction vessel may be more perfectly controlled and kept uniform than heretofore if relatively thin bundles of compressed tin scrap are employed or if the bundles are so placed that their laminæ run in the same direction that the detinning reagent is caused to flow. The best results, however, are obtained by using relatively thin compressed bundles and placing them with their laminæ in the same direction that the detinning reagent is flowing in the reaction vessel, because under such conditions the chlorin gas or other detinning reagent employed can most readily flow along all of the surfaces, both inner and outer, of the bundles, and most easily penetrate to the interior of such bundles and flow along the substantially parallel surfaces of the innermost pieces of scrap in the bundles; and the stannic chlorid resulting from the reaction of the chlorin or other reagent on the tin content of the scrap can most easily flow off, in the type of apparatus and with the mode of operation we ordinarily employ, to wit, high tanks or reaction vessels through which the chlorin gas or other reagent is circulated substantially vertically. Thus, in the preferred mode of practicing our improved process we make use of relatively thin bundles of compressed tin scrap in which the laminæ of the bundles are substantially parallel with the plane of the bundles and place these bundles on edge in the reaction vessel, usually in superposed layers at an angle to the horizontal, preferably in a substantially vertical position and with the bundles spaced slightly apart to form small open spaces or passages between the adjacent bundles, and then circulate the detinning reagent through such bundles in the direction of their planes and laminæ, thereby enabling the reagent to flow freely over all the surfaces of the pieces of tin scrap in said bundles and permitting the heavy liquid stannic chlorid resulting from the reaction to flow or drain quickly away from such surfaces to the bottom of the reaction vessel.

In the drawings accompanying this application we have illustrated one type of apparatus in which our process may be performed, Figure 1 showing said apparatus in vertical section and elevation, and Fig. 2 illustrating in detail and on an enlarged scale the construction of and mode of assembling the bundles used in carrying out the process.

Referring now to Fig. 1, we have shown in this view an apparatus similar to that illustrated in our prior application hereinbefore referred to. In this view a suitable reaction chamber or vessel is indicated at 2, in or through which the detinning reagent, such as chlorin gas or chlorin gas combined with an inert gas or gases or with an anhydrous liquid, may be circulated. In the present case a pipe 3 is shown for permitting circulation of the reagent lengthwise through the detinning vessel, the direction of the flow usually being from the top toward the bottom of said vessel. A pump is preferably employed for circulating the reagent, a suitable pump for this purpose being indicated at 4. During the reaction cold water may be kept flowing over the outer surface of the detinning vessel for the purpose of absorbing as much as possible of the heat of said vessel and of the gases in contact with the walls of the same or lying close to the inner surface thereof. The more rapid the circulation of the gases within the vessel the greater of course will be the cooling effect of the metallic walls of the vessel on said gases. We prefer to employ, either alone or as an auxiliary to the application of cold water to the outer walls of the chamber 2, a system of cooling pipes, such as 5, for the purpose of cooling the circulating reagent.

In carrying out our improved process we proceed as follows: Baskets, such as 6, having open or perforated side and bottom walls, are first filled with bundles 7 of compressed tin scrap, which bundles may to advantage measure about 16 inches by 24 inches, by 4 to 6 inches in thickness, with the laminæ 8 thereof running substantially parallel with one another in the direction of the plane of each bundle. These bundles are preferably placed on edge in the baskets 6, as indicated, and are shown so disposed in such baskets as to leave small spaces or passages 9 between adjoining bundles. This is for the purpose of facilitating a free flow of the detinning reagent substantially vertically through the detinning chamber, and for the further purpose of facilitating the drainage of the stannic chlorid formed at the outer surfaces of the bundles and that which falls through each basket of bundles from superposed layers of bundles. The reaction vessel is then filled with these baskets or bundles and closed and the detinning reagent introduced in any suitable way set forth in our previous patent and application hereinbefore mentioned. The reagent, such as chlorin gas, either alone or combined with an inert gas or gases, etc., is then circulated through the reaction vessel, preferably from the top to the bottom thereof, following the surfaces of the bundles and their laminæ throughout its flow. Simultaneously with the circulation of the detinning reagent the cooling means employed are also caused to circulate for the purpose of carrying off the heat generated by the reaction and reducing the temperature of the circulating reagent, both of these results being facilitated by forming and placing the bundles of scrap in the manner herein described, as the minimum resistance of closely compressed bundles is thus opposed to the flow of the reagent by the scrap itself and by the stannic chlorid that drains off therefrom, which permits more rapid flow of the reagent than with bundles placed with their laminæ substantially transverse to the line of flow of the reagent, and also assures a more rapid abstraction of heat from the circulating reagent by the cooling means.

The stannic chlorid resulting from the reaction drains rapidly from the surfaces of the tin scrap as it is formed and falls to the bottom of the vessel, from which it may be drawn off by a special pump as it is formed, instead of permitting it to pass through the pump by means of which the reagent is circulated.

In connection with this process the auxiliary means described in our aforesaid application may also be employed for facilitating the cooling action, that is to say, fine streams of anhydrous heat-absorbing fluid, such as liquid stannic chlorid, may be caused to flow lengthwise through the reaction chamber in contact with the circulating reagent.

What we claim is:

1. The process of detinning tin scrap, which consists in placing laminated bundles of compressed tin scrap in a vessel with the laminæ disposed at an angle to the horizontal, and subjecting said bundles to the action of a detinning reagent.

2. The process of detinning tin scrap, which consists in placing laminated bundles of compressed tin scrap in a vessel with the laminæ disposed substantially vertically, and subjecting said bundles to the action of a detinning reagent.

3. The process of detinning tin scrap, which consists in placing laminated bundles of compressed tin scrap in a vessel with the laminæ disposed at an angle to the horizontal, and circulating a detinning reagent through said laminated bundles in the direction of the laminæ.

4. The process of detinning tin scrap, which consists in placing laminated bundles of compressed tin scrap in a vessel with the laminæ disposed substantially vertically, and circulating a detinning reagent through said laminated bundles in the direction of the laminæ.

5. The process of detinning tin scrap, which consists in placing laminated bundles of compressed tin scrap in a closed vessel with the laminæ disposed substantially vertically, and circulating chlorin gas through said laminated bundles from the top toward the bottom of said vessel.

6. The process of detinning tin scrap, which consists in placing laminated bundles of compressed tin scrap in a vessel with the laminæ disposed at an angle to the horizontal, circulating a cool detinning reagent through said laminated bundles in a direction parallel with the laminæ and cooling said circulating reagent.

7. The process of detinning tin scrap, which consists in placing relatively thin bundles of compressed tin scrap in a vessel with the plane of the bundles at an angle to the horizontal, and subjecting said bundles to the action of a detinning reagent.

8. The process of detinning tin scrap, which consists in placing relatively thin bundles of compressed tin scrap in a vessel with the planes of the bundles disposed substantially vertically, and subjecting said bundles to the action of a detinning reagent.

9. The process of detinning tin scrap, which consists in placing relatively thin bundles of compressed tin scrap in a vessel with the planes of the bundles at an angle to the horizontal, and circulating a detinning reagent through said bundles in the general direction of said planes.

10. The process of detinning tin scrap, which consists in placing relatively thin bundles of compressed tin scrap in a vessel with the planes of the bundles at an angle to the horizontal and with open spaces between adjacent bundles, and subjecting said bundles to the action of the detinning reagent.

11. The process of detinning tin scrap, which consists in placing relatively thin bundles of compressed tin scrap in a vessel with the planes of the bundles disposed substantially vertically and with open spaces between adjacent bundles, and circulating a detinning reagent through said open spaces in a substantially vertical direction.

12. The process of detinning tin scrap, which consists in placing relatively thin bundles of compressed tin scrap in superposed layers in a closed vessel with the planes of the bundles of each layer at an angle to the horizontal and circulating a detinning reagent through the bundles of all of said layers in a direction substantially parallel with said planes.

13. The process of detinning tin scrap, which consists in placing relatively thin bundles of compressed tin scrap in superposed layers in a closed vessel with the planes of the bundles of each layer at an angle to the horizontal and with open spaces in each layer between adjacent bundles, and circulating a detinning reagent through the bundles of all of said layers in a direction substantially parallel with said planes.

14. The process of detinning tin scrap, which consists in placing relatively thin bundles of compressed tin scrap in superposed layers in a closed vessel with the planes of the bundles of each layer disposed substantially vertically and with open spaces in each layer between adjacent bundles, and circulating a detinning reagent through the bundles of all of said layers in a direction substantially parallel with said planes.

15. The process of detinning tin scrap, which consists in placing relatively thin bundles of compressed tin scrap made up of flat laminæ in a vessel with the laminæ and the planes of the bundles disposed at an angle to the horizontal, and subjecting said bundles to the action of a detinning reagent.

16. The process of detinning tin scrap, which consists in placing relatively thin bundles of compressed tin scrap made up of flat laminæ in a vessel with the laminæ and the planes of the bundles disposed substantially vertically, and subjecting said bundles to the action of a detinning reagent.

17. The process of detinning tin scrap, which consists in placing relatively thin bundles of compressed tin scrap made up of flat laminæ in a closed vessel with the laminæ and the planes of the bundles disposed substantially vertically, and circulating a detinning reagent through said bundles in the general direction of said laminæ and planes.

18. The process of detinning tin scrap, which consists in placing relatively thin bundles of compressed tin scrap made up of flat laminæ in a vessel with the laminæ and the planes of the bundles disposed at an angle to the horizontal and with open spaces between adjacent bundles, and circulating a detinning reagent through said bundles in a direction substantially parallel with said laminæ, planes and open spaces.

19. The process of detinning tin scrap, which consists in placing relatively thin bundles of compressed tin scrap made up of flat laminæ in superposed layers in a closed vessel with the laminæ and planes of the bundles of each layer at an angle to the horizontal, and subjecting said bundles to the action of the chlorin gas.

In testimony whereof we have signed this specification in the presence of two subscribing witnesses.

KARL GOLDSCHMIDT. [L. S.]
JOSEF WEBER. [L. S.]

Witnesses:
OTTO KÖNIG,
CHAS. J. WRIGHT.